Patented Jan. 26, 1954

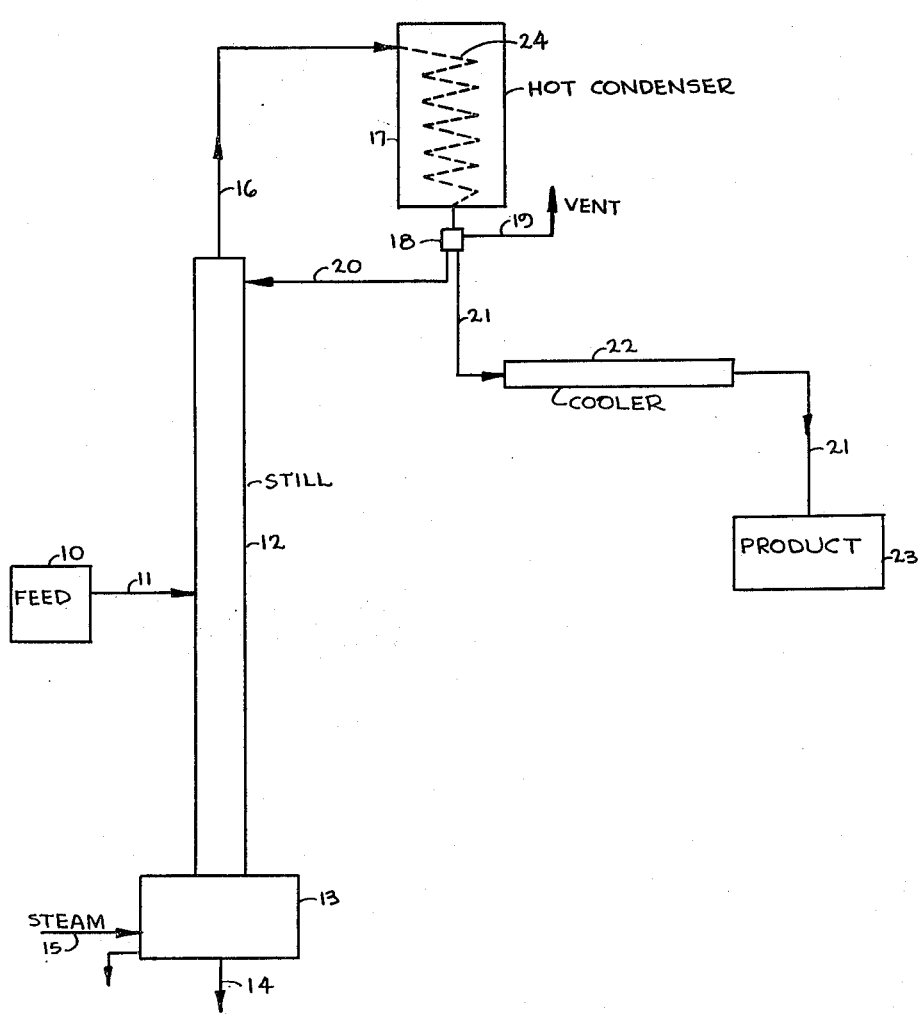

2,667,451

UNITED STATES PATENT OFFICE 2,667,451

PROCESS FOR REMOVING SMALL QUANTITIES OF DIMETHYLAMINE FROM DIMETHYLACETAMIDE

Robert J. Larson, Springfield, Mass., assignor, by mesne assignments, to The Chemstrand Corporation, a corporation of Delaware Application August 25, 1951, Serial No. 243,683

3 Claims. (Cl. 202—69)

This invention relates to a method for purifying dimethyl acetamide and especially to a method for removing minor amounts of dimethylamine which occur as impurities therein.

A method for preparing dimethyl acetamide is described in copending application of Cole Downing, filed of even date herewith and identified as Serial No. 243,685, which case is assigned to the same assignee as is the present case.

In the Downing process described in said application, dimethyl acetamide is prepared by reacting acetic acid or acetic anhydride with dimethylamine, the reaction being carried out in a liquid body of dimethyl acetamide and acetic acid in which body the content of acetic acid is less than the azeotrope thereof. The azeotrope of dimethyl acetamide and acetic acid was discovered by Ruhoff and Reid, 59 JACS 401 (1937) and found to contain 21.1% of acetic acid and to boil 4–5° C. above the boiling temperature of the pure dimethyl acetamide. During the reaction the composition of the reacting mass in the Downing process is maintained at less than 21.1% of acetic acid. Under these conditions the vapors distilling therefrom are higher in dimethyl acetamide content and may be subjected to refluxing and condensation and the dimethyl acetamide then obtained in relatively pure form.

The product as obtained from the Downing process is useful for many chemical purposes. For certain purposes, especially where it is used to prepare solutions of resins, it has, however, been found that the presence of as little as 0.01% of dimethylamine in dimethyl acetamide has a pronounced gelling effect upon solutions of resins formed therewith. It is, accordingly, an object of the present invention to provide a process whereby these relatively small quantities of dimethylamine may be removed therefrom and a product obtained which contains not more than about 0.001% by weight.

In accordance with my invention I vaporize the dimethyl acetamide in a distilling column by boiling, and pass the vapors upwardly through the fractionating column, then conduct the vapors to a condenser so as to condense the same to form liquid dimethyl acetamide at a temperature above 90° C., but below the boiling point thereof. At this point I separate the uncondensed, vaporized dimethylamine from the liquid phase prior to further cooling the latter. After separation of the dimethylamine vapors therefrom I then cool the liquid dimethyl acetamide to room temperature out of contact with the said dimethylamine vapors. By this process I am able to obtain a dimethyl acetamide product containing less than 0.01% of dimethylamine. A more complete elimination of dimethylamine is obtained if the condensation occurs at a temperature of above 110° C., while almost complete elimination of dimethylamine occurs if the condensation is effected at the boiling point at or approximating atmospheric pressure.

Reference is made to the accompanying drawing showing an assembly of apparatus in which my process may be practiced.

In the drawing, numeral 10 indicates a feed tank, 11 a pipe for conveying the contents of said tank to still 12. The lower section of the still is provided with a heating section 13 containing steam heating coils 15 and also bottom drain 14. The upper part of the still is connected by vapor line 16 with a hot condenser 17. The condenser 17 may consist of a pipe 24 immersed in a heated fluid of any type. The lower end of the pipe 24 is connected to a split flow box 18, which is provided with a vapor vent 19. Box 18 divides the condensate stream into a reflux stream 20 which is returned to the still 12 and a product stream 21 flowing to cooler 22 and then to product storage tank 23.

The present invention is carried out as follows: dimethyl acetamide contained in feed tank 10 is introduced to still 12 by pipe 11. Heat is supplied to the still by means of boiler 13 whereby the temperature of the contents of the still is raised to the boiling point, which at 760 mm. pressure is 166° C. The vapors produced in the boiler pass upwardly through the still and then by pipe 16 into hot condenser 17, wherein only sufficient heat is removed so as to condense the vapor and cool the liquid to a temperature above 90° C., but below 166° C. at atmospheric pressure. The hot liquid condensate flows into split flow box 18 provided with vapor vent 19 and is therein split into two streams. One of said streams flows out by pipe 20 and is returned to still 12 as reflux. The other stream flowing out by pipe 21 passes to cooler 22 wherein it is cooled to room temperature. It then flows through pipe 21 into product tank 23.

The dimethylamine vapor separating from the hot condensate in box 18 is vented to the air by pipe 19.

The dimethyl acetamide containing originally between 0.02% to 0.05% of dimethylamine when treated by the present invention is obtained as a product wherein the content of dimethylamine is not more than about 0.001% by weight.

This application is a continuation-in-part of my copending application Serial No. 106,432, filed July 23, 1949, now abandoned.

What I claim is:

1. A continuous process for removing dimethylamine from dimethylacetamide containing between 0.02 and 0.05% dimethylamine which comprises, fractionally distilling said dimethylacetamide, condensing the vapors produced at a temperature above 90° C. and below the boiling point of the dimethylacetamide containing the dimethylamine, separating the uncondensed dimethylamine from the condensate at said condensing temperature, continuously returning a portion of said condensate to the fractionating step, and further cooling the remainder of said condensate to room temperature while out of contact with said dimethylamine, said cooled condensate comprising dimethylacetamide containing not more than about 0.001% by weight of dimethylamine.

2. A continuous process for removing dimethylamine from dimethylacetamide containing between 0.01 and 0.05% of dimethylamine which comprises, fractionally distilling said dimethylacetamide, condensing the vapors produced at a temperature above 110° C. and below the boiling point of the dimethylacetamide containing the dimethylamine, separating the uncondensed dimethylamine from the condensate at said condensing temperature, continuously returning a portion of said condensate to the fractionating step, and further cooling the remainder of said condensate to room temperature while out of contact with said dimethylamine, said cooled condensate comprising dimethylacetamide containing not more than about 0.001% by weight of dimethylamine.

3. The process as defined in claim 2 wherein the vapors are condensed at a temperature approximating the boiling point of the dimethylacetamide containing in excess of 0.01% dimethylamine.

ROBERT J. LARSON.

References Cited in the file of this patent

UNITED STATES PATENTS

| Number | Name | Date |
|---|---|---|
| 1,884,509 | Bailey | Oct. 25, 1932 |
| 1,885,029 | Dressel | Oct. 25, 1932 |

OTHER REFERENCES

Journal of the American Chemical Society, vol. 59, February 1937, pages 401–402.